(No Model.)

T. H. NEEDHAM.
CLUTCHING MECHANISM FOR PLANERS.

No. 453,415. Patented June 2, 1891.

WITNESSES:
Chas. H. Luther Jr.
M. F. Bligh.

INVENTOR:
Thomas H. Needham
by Joseph A. Miller & Co.
Attys.

THE NORRIS PETERS CO., PHOTO-LITHO., WASHINGTON, D. C.

UNITED STATES PATENT OFFICE.

THOMAS H. NEEDHAM, OF PROVIDENCE, RHODE ISLAND.

CLUTCHING MECHANISM FOR PLANERS.

SPECIFICATION forming part of Letters Patent No. 453,415, dated June 2, 1891.

Application filed February 5, 1891. Serial No. 380,322. (No model.)

*To all whom it may concern:*

Be it known that I, THOMAS H. NEEDHAM, of the city of Providence, in the county of Providence and State of Rhode Island, have invented certain new and useful Improvements in Clutching Mechanism; and I hereby declare that the following is a full, clear, and exact description of the same, reference being had to the accompanying drawings, forming part of this specification.

This invention has reference to an improved clutching mechanism for planing-machines.

The object of this invention is to produce a clutching mechanism by which the feed-screw or traveling tool-holder of a lathe or planing-machine may be automatically released from the driving-gear.

To this end my invention consists in the peculiar features of construction and novel combination of parts, which will be more fully described hereinafter, and pointed out in the claims.

Figure 1:
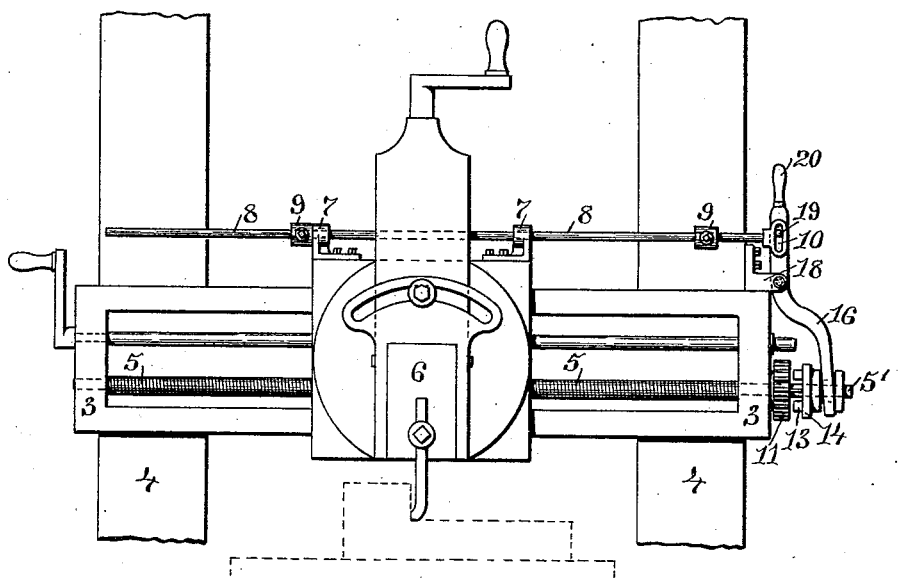
Figure 2:
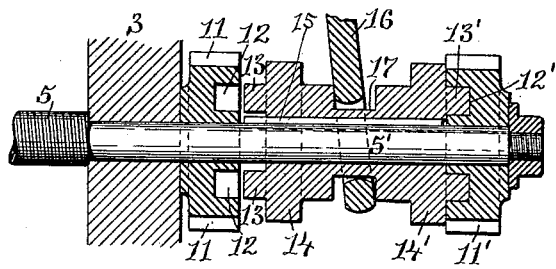

Figure 1 is a view of the feed-screw and traveling tool-holder of a planing-machine and the clutching device, showing the operation of the same. Fig. 2 is a longitudinal sectional view of the clutching device and driving-gear.

Similar numbers of reference designate corresponding parts in both figures.

In the drawings, 3 indicates a longitudinal frame of a planing-machine, which is supported by the standards 4 4 and has the feed-screw 5 journaled in bearings provided in the ends thereof.

The traveling tool-holder 6 is provided with a gear which engages with the thread of the feed-screw 5 and has the slides 7 7, which move on a rod 8, provided with the adjustable stops 9 9 and the slotted end 10.

On the shaft end of the feed-screw 5 is placed the loose gear 11, which intermeshes with and is driven by the main driving-gear. This loose gear 11 is provided with the depressions 12 12, which correspond to the projections 13 13, formed on the surface of the clutch 14. The clutch 14 is formed as shown in the drawings, and is secured to the shaft of the feed-screw 5 by the spline 15, engaging in a longitudinal slot extending through the bore of the clutch-pulley, thereby preventing any independent rotation of the feed-screw 5 or of the clutch 14, but allowing the clutch 14 to be moved longitudinally over the shaft of the feed-screw by the movement of the lever 16, working on the collar 17. The lever 16 is pivotally secured to the bracket 18, which is secured to the standard 4 and has a pin 19, which engages with the slotted end 10 of the rod 8. A handle 20 is provided on the upper end of the lever 16, in order that the clutch mechanism may be operated by hand.

The collar 17 may be provided with a duplicate of the clutch-disk 14, with projections similar to those numbered 13 extending in an opposite direction and engaging with corresponding depressions in a loose pulley carried on the end of the shaft 5', which may be driven in an opposite direction to the pulley 11, and which, when thrown into connection by the clutching device, will drive the feed-screw in a proper direction to return the tool-holder 6 back to the starting-point.

The improved clutching device may be attached, as above described, to any ordinary planing machine or lathe, and the length of stroke can be readily governed by the adjustment of the stops 4 4 on the rod 8. When one of these stops is struck by either of the slides 7 7, the rod 8 is moved in the direction of the travel of the tool-holder, and the lever 16 is operated to engage the projections 13 of the clutch with the depressions 12 of the loose gear 11, or to disengage them therefrom.

Having thus described my invention, I claim as new and desire to secure by Letters Patent—

1. In a clutching device for lathes or planers, the combination, with the feed-screw 5 and shaft 5', having the gear 11, provided with the depressions 12, rotating loosely thereon, of a clutch-pulley 14, provided with the projections 13 and secured to the shaft 5' by the spline 15, and a lever 16, adapted to operate the clutching device, as described.

2. In an automatic clutching device for lathes or planers, the combination, with the gear-wheel 11, having the depressions 12 and rotating loosely on the shaft of the feed-screw, of a clutch-pulley 14, provided with the projections 13, revolving with the shaft of the feed-screw, the lever 16, pivotally secured to the bracket 18 and loosely connected by the pin 19 to the slotted end of the rod 8, on which are secured the stops 9 9, adapted to be moved by contact with the slides 7 7, carried on the tool-holder, to operate the lever and disengage the clutch-pulley from the driving-gear, as described.

3. In a lathe or planer clutch-operating device, the combination, with the tool-holder 6, having the slides 7 7 moving over the rod 8, provided with stops 9 9 and slotted end 10, of the lever 16, pivotally secured to the bracket 18 and engaging at the lower end with the collar 17 of the clutch-pulley 14, as described.

4. In reversing clutching mechanism, the combination, with the worm-gear 5, having the shaft 5′, and the gears 11 and 11′, provided with the depressions 12 and 12′, revolving loosely thereon and driven in opposite directions, of the double clutch-pulley 14, having the projections 13 and 13′ and operated by a lever 16, pivotally secured to the bracket 18, as described.

In witness whereof I have hereunto set my hand.

THOMAS H. NEEDHAM.

Witnesses:
  JOSEPH A. MILLER, Jr.,
  HENRY J. MILLER.